Feb. 22, 1955     E. S. DONALDSON     2,702,660
COMBINED HOLDER AND OPENER FOR CONTAINERS
Filed Dec. 1, 1951
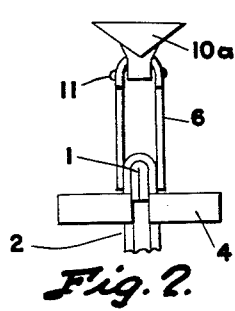
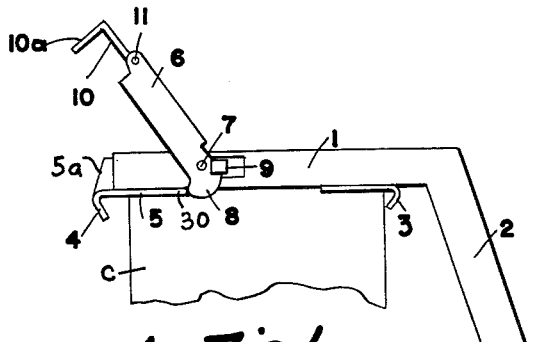
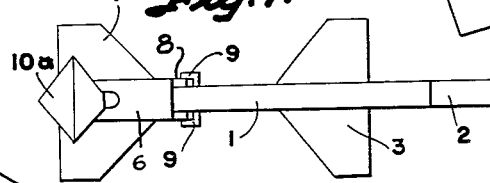
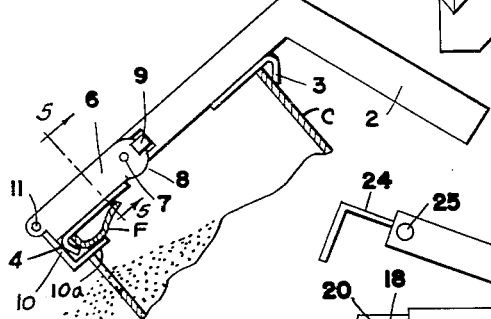
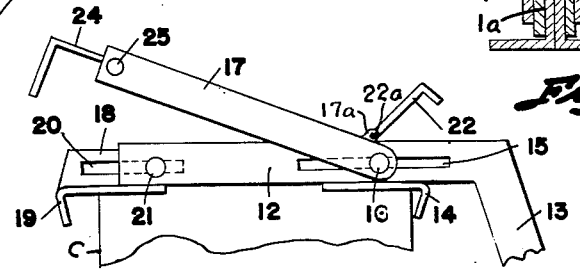
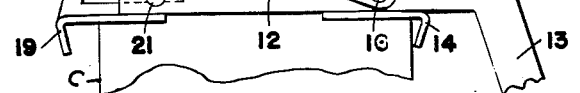
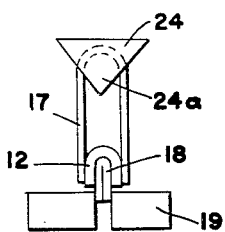
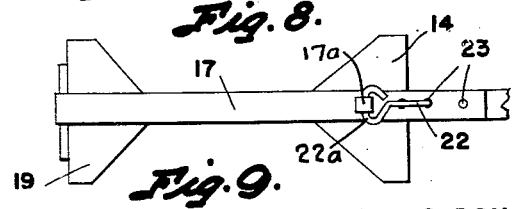
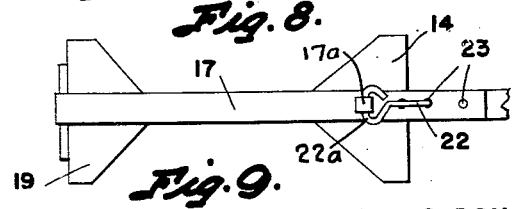
INVENTOR.
EDWIN S. DONALDSON
BY Owen W. Kennedy
ATTORNEY

United States Patent Office 2,702,660
Patented Feb. 22, 1955

2,702,660

COMBINED HOLDER AND OPENER FOR CONTAINERS

Edwin S. Donaldson, Boylston, Mass.

Application December 1, 1951, Serial No. 259,439

5 Claims. (Cl. 229—7)

The present invention relates to a combined holder and opener for containers of the type that are extensively employed in the form of cardboard boxes for the packaging of washing powders and similar granular materials, as well as some forms of cereal food products.

The object of the present invention is to provide a device of the above indicated character so constructed that it may be attached readily to a container by a simple operation, so as to serve the double purpose of a holder and opener for the container, as well as providing a convenient handle for the opened container while dispensing its contents. The device of the present invention is adapted to fit standard sizes of cardboard boxes that are presently employed for packaging various granular materials, with the device being adjustable so that it may be applied to boxes of varying size.

The above and other advantageous features of the invention will hereinafter more fully appear from the following description, considered in connection with the accompanying drawings, in which, Fig. 1 is a view in side elevation of a device embodying the present invention in open position, and illustrating the manner in which it is applied to the top of a container.

Fig. 2 is a view in end elevation of the device of Fig. 1, as viewed from the left.

Fig. 3 is a top plan view of the device shown in Fig. 1.

Fig. 4 shows the device as fully applied to a container, and further illustrates its use as a handle.

Fig. 5 is a sectional view along the line 5—5 of Fig. 4, looking in the direction of the arrows.

Fig. 6 is a view in side elevation illustrating a modification of the device, so that it can be applied to containers of varying size.

Fig. 7 is a view in end elevation of the device shown in Fig. 6, as viewed from the left.

Fig. 8 shows the device of Fig. 6 fully applied to a container.

Fig. 9 is a top plan view of the device of Fig. 8.

Referring to Figs. 1, 2 and 3, the device comprises a holder 1 in the form of a longitudinally slotted bar having a length somewhat greater than the length of the top of a container C to which the holder is to be applied. The container C is shown as being in the form of a rectangular box composed of cardboard or similar material, such as is used for the packaging of washing powders and similar granular compositions that are employed for household purposes. Containers of this type are usually provided at one end with a flap F, see Figs. 4 and 6, that is outlined by perforations, so that the flap can be pressed in to provide an opening through which the contents of the container can be poured.

One end of the holder 1 provides a downwardly extending handle 2, and a clamp 3 projects from the underside of the holder 1 adjacent to the handle 2, so that the clamp 3 will engage one end of the container C when the holder 1 is placed on its top. A second clamp 4 is mounted on a plate 5 which provides a rib 5a slidable within a longitudinal slot 1a within the holder 1, see now Fig. 5, and when the holder 1 is placed on top of the container C, the second clamp 4 is spaced a short distance from the side of the container opposite to the fixed clamp 3.

It will be apparent from a consideration of Fig. 3 that the clamps 3 and 4 are of such width as to support the holder 1 on the top of the container C, with the handle 2 extending downwardly. In order to move the clamp 4 towards the fixed clamp 3 and thereby secure the holder in position, a clamping lever 6 is mounted on the holder 1 so as to turn about a pivot 7. The lower end of this lever provides a cam portion 8, which, when the lever 6 is raised, engages the inner end 30 of clamp plate 5 and maintains the clamp 4 in the position of Fig. 1. However, when the lever 6 is turned downwardly into the position of Fig. 4, the cam portion 8 engages ears 9 formed on the inner rib 5a of the plate 5 so as to draw the clamp 4 inwardly and cause it to engage the left-hand end of the container C. Therefore, when the lever 6 is moved to the position of Fig. 4, the holder 1 serves to firmly grip the top of the container C, by reason of the fact that the distance between the inner ends of the clamps 3 and 4 is then somewhat less than the length of the container as measured along its top. Obviously, the yieldable nature of the container material contributes to the gripping action of clamps 3 and 4.

In order to open the container and to positively lock the holder in position, the end of the lever 6 provides a combined blade and latch member 10 which is adapted to turn about a pivot 11. The member 10 is of L-shaped form and its free end is pointed as indicated at 10a in Fig. 2. Therefore, when the lever 6 is first moved into the position of Fig. 4 to clamp the holder 1 on the container, the member 10 extends parallel with the top of the container, and pointed end 10a is directed downwardly away from the top of the container. When the member 10 is then turned about its pivot 11 in a counterclockwise direction, the pointed end 10a will engage the container flap F and cause separation of the flap from the container wall along the perforations. Final turning movement of the member 10 to the full line position of Fig. 4 will result in bending the flap F upwardly so as to fully expose the opening in the top of the container, in which position the member 10 will also engage the movable clamp 4 that has been previously operated by the lever 6. It will be evident that as long as the member 10 remains in this latching position it serves as a positive lock for the lever 6, with the result that the container C is firmly held between the clamps 3 and 4, when once it has been opened.

When the holder 1 has been applied to a container in the manner described above, the handle 2 permits the container C to be readily lifted so as to pour its contents through the opening that has been created by bending back the flap F. With the container thus firmly held at its top there is no chance of its sides collapsing when in use, as frequently occurs when a partially filled container is grasped between the fingers for the purpose of lifting the same. Thus, the container can be used conveniently until it is empty, after which the holder 1 can be released readily by first turning the member 10 in a clockwise direction to free it from the clamp 4, and then turning the lever 6 upwardly to release the clamp 4 from the container.

Referring now to Figs. 6 and 7, there is shown a modification of the device which enables it to be applied to containers of varying size. In the modified form of my device, the longitudinally slotted holder 12 provides a handle 13 and a fixed clamp 14 similar to the corresponding elements of Fig. 1 and also provides side slots 15 for receiving a pin 16 on which a clamping lever 17 is pivoted. The pivot pin 16 is attached to the right-hand end of a slide member 18 which is the equivalent of inner rib 5a of the device shown in Fig. 1. Clamp 19 is attached to the left-hand end of slide member 18. The clamp slide 18 provides a slot 20 through which extends a fixed guide pin 21, so that the slide will be prevented from turning about the pivot pin 16 when the slide is moved back and forth in order to adjust the distance between the clamps 14 and 19.

Fig. 6 illustrates the manner in which the movable clamp 19 may be adjusted to fit the top of a container C, with the lever 17 in a raised position, and after this adjustment has been made, the lever 17 is locked in this position by a hook 22 pivoted at one end 22a within an eye member 17a on the lever 17, with its free end receivable in any one of a number of openings 23 provided in the top of the holder 12, see Fig. 9. Each opening 23 corresponds with a different standard size container. By virtue of the fact that eye member 17a is offset horizontally to the left from pin 16, a counterclockwise turning of lever 17 about pivot end 22a will result in pulling the pin 16 and slide member 18 to the right, thus causing clamp member 19 to engage the left-hand edge of the top of the container. The above described clamping operation will take place with the hook 22 received in any opening 23, so that the holder 12 can be adjusted so as to clamp the tops of different sized containers, it being noted that the container C of Fig. 6 is considerably longer than the container shown in Fig. 1.

In order to open the container and to lock the holder 12 in position, the lever 17 provides a combined blade and latch member 24, similar to the member 10 of Fig. 1. Turning of this member 24 about its pivot 25 will serve to push in the container flap F along its perforations to provide an opening through which the contents of the container may be poured, with the member 24 serving to positively lock the holder 12 in position through cooperation with the clamp 19. With the latch member 24 in this position the flap F is kept open until the container is empty of its contents.

From the foregoing, it is apparent that by the present invention there is provided a combined holder and opener for any rectangular container composed of relatively yieldable material such as cardboard, with the parts of the holder serving to firmly clamp the top of the container so that the holder will serve as a handle after the container has been opened. The device of the present invention is so constructed that it may be applied readily to containers of standard size, with provision for adjustment of the holder clamps so as to adapt the holder for use with containers of varying size.

I claim:

1. A device for holding and opening rectangular containers for solid particulate material, said containers being composed of yieldable material, said device comprising a substantially horizontal member for application to the top of a container and providing a downwardly extending portion at one end of said horizontal member to serve as a handle, a fixed clamping member projecting downwardly from said horizontal member at a point near said handle member to engage one end of the container top, a second clamping member slidably mounted on said horizontal member near the other end thereof and facing oppositely to the fixed clamping member, with each of said clamping members being wide enough to extend across the container top on both sides of said horizontal member, a lever pivotally mounted on said horizontal member and adapted by its turning movement into overlying relation with said movable clamping member to force the latter into engagement with the end of the container top opposite to said fixed clamping member, and a pointed member pivotally mounted at the free end of said lever for opening the same end wall of the container with which the movable clamping member is engaged and locking it in container holding position.

2. A device for holding a rectangular cardboard container of the type having a perforated flap in the upper end of one of its side edges comprising a substantially horizontal member adapted to engage the top of said container, a fixed clamping member projecting downwardly from said horizontal member at a point near one end of said horizontal member, said fixed clamping member being adapted to engage the side edge of said container opposite from said flap, a handle mounted at one end of said horizontal member proximate to said fixed clamping member, a second clamping member slidably mounted at the other end of said horizontal member and facing oppositely to said fixed clamping member, said second clamping member being adapted to engage the side edge having said flap, a lever pivotally mounted on said horizontal member and adapted by its turning movement to force said second clamping member towards said fixed clamping member and the side edge having said flap, and a pointed member pivotally mounted at the free end of said lever for engaging said flap, said pointed member being adapted by its turning movement to force said flap inwardly away from its perforation into an open position, said pointed member simultaneously locking said lever against said movable clamping member.

3. The device according to claim 2 wherein the pivot point between said lever and said horizontal member is horizontally adjustable along said horizontal member so as to make said device adaptable to various sizes of containers.

4. A device for holding a rectangular container composed of yieldable material, said container being of the type having a perforated flap in the upper end of one of its side edges, comprising a substantially horizontal member adapted to engage the top of said container, a substantially vertical fixed clamping member projecting downwardly from said horizontal member at a point near one end thereof, said fixed clamping member being adapted to engage the side edge of said container opposite from said flap, a handle mounted at one end of said horizontal member proximate to said fixed clamping member, a second clamping member slidably mounted at the other end of said horizontal member and having a substantially vertical projection extending downwardly therefrom, said second clamping member being adapted to engage the side edge having said flap, a lever pivotally mounted on said horizontal member and adapted by its turning movement to force said second clamping member towards said fixed clamping member and against the side edge having said flap, and a pointed member pivotally mounted at the free end of said lever for engaging said flap, said pointed member being adapted by its turning movement to force said flap inwardly away from its perforation and to lock into position beneath said vertical projection of said second clamping member.

5. The device according to claim 4 wherein the pivot point between said lever and said horizontal member is horizontally adjustable along said horizontal member so as to make said device adaptable to various sizes of containers.

References Cited in the file of this patent

UNITED STATES PATENTS

| Number | Name | Date |
|---|---|---|
| 1,245,333 | Goldberg | Nov. 6, 1917 |
| 1,311,103 | Walker | July 22, 1919 |
| 1,468,438 | Bussanich | Sept. 18, 1923 |
| 1,878,956 | Manteufel | Sept. 20, 1932 |
| 1,991,247 | Hamlin | Feb. 12, 1935 |
| 2,161,090 | Richert | June 6, 1939 |
| 2,547,556 | Benigar | Apr. 3, 1951 |

FOREIGN PATENTS

| 323,173 | Italy | Dec. 11, 1934 |